(12) United States Patent
Choudhri et al.

(10) Patent No.: US 10,823,398 B2
(45) Date of Patent: Nov. 3, 2020

(54) SWIRL TORCH IGNITER

(71) Applicant: Board of Regents, The University of Texas System, Austin, TX (US)

(72) Inventors: Ahsan R. Choudhri, El Paso, TX (US); Norman D. Love, Jr., El Paso, TX (US); Luis E. Sanchez, Sunland Park, NM (US); Charles S. Hill, Las Cruces, NM (US)

(73) Assignee: Board of Regents, The University of Texas System, Austin, TX (US)

( * ) Notice: Subject to any disclaimer, the term of this patent is extended or adjusted under 35 U.S.C. 154(b) by 286 days.

(21) Appl. No.: 15/609,898

(22) Filed: May 31, 2017

(65) Prior Publication Data

US 2017/0350590 A1    Dec. 7, 2017

Related U.S. Application Data

(60) Provisional application No. 62/344,354, filed on Jun. 1, 2016.

(51) Int. Cl.
| | |
|---|---|
| *F23D 11/10* | (2006.01) |
| *F23Q 3/00* | (2006.01) |
| *F02K 9/95* | (2006.01) |
| *F23D 14/02* | (2006.01) |

(Continued)

(52) U.S. Cl.
CPC .......... *F23D 11/103* (2013.01); *F02K 9/95* (2013.01); *F23D 14/02* (2013.01); *F23Q 3/008* (2013.01); *F02C 7/264* (2013.01); *F02P 15/001* (2013.01); *F23D 2207/00* (2013.01)

(58) Field of Classification Search
CPC .... F23D 11/103; F23D 14/02; F23D 2207/00; F02K 9/95; F02C 7/26; F02C 7/264; F02C 7/266
See application file for complete search history.

(56) References Cited

U.S. PATENT DOCUMENTS

| | | | |
|---|---|---|---|
| 5,491,972 A | * | 2/1996 | Bretz .................... F02C 7/264 60/39.821 |
| 5,899,229 A | | 5/1999 | Farnham |
| 6,234,784 B1 | | 5/2001 | Yoshinaga et al. |

(Continued)

OTHER PUBLICATIONS

English-language translation of Bock DE 1275837 (Year: 1968).*

(Continued)

*Primary Examiner* — Arun Goyal
(74) *Attorney, Agent, or Firm* — Yee & Associates, P.C.

(57) ABSTRACT

A torch igniter and a method of igniting a torch flame. An example embodiment includes a body including an oxidizer inlet configured to facilitate oxidizer flow through the body toward an output end of the body. The body includes a group of fuel inlet passages configured to distribute fuel in a direction tangential to the oxidizer flow through the body to create a swirling fuel-oxidizer mixture. A sparking element can be mounted on the body to produce a spark in the path of the swirling fuel-oxidizer mixture to ignite the mixture. The output end of the body is configured to emit a torch flame when the fuel-oxidizer mixture is ignited. Thus, a swirl torch igniter is configured for oxidizer and fuel flow through the igniter body to create an internal swirling fuel-oxidizer mixture to be ignited by a sparking element.

20 Claims, 8 Drawing Sheets

(51) Int. Cl.
*F02P 15/00* (2006.01)
*F02C 7/264* (2006.01)

(56) References Cited

U.S. PATENT DOCUMENTS

| | | |
|---|---|---|
| 6,748,735 B2 | 6/2004 | Schmotolocha et al. |
| 6,820,411 B2 | 11/2004 | Pederson et al. |
| 6,912,857 B2 | 7/2005 | Schmotolocha et al. |
| 7,137,255 B2 | 11/2006 | Schmotolocha et al. |
| 7,299,600 B2 | 11/2007 | Stuttaford et al. |
| 8,033,112 B2 | 10/2011 | Milosavljevic et al. |
| 8,850,820 B2 | 10/2014 | Milosavljevic et al. |
| 8,863,524 B2 | 10/2014 | Karlsson et al. |
| 2004/0031257 A1 | 2/2004 | Schmotolocha et al. |
| 2004/0168442 A1 | 9/2004 | Schmotolocha et al. |
| 2005/0284442 A1 | 12/2005 | Stuttaford et al. |
| 2008/0299504 A1* | 12/2008 | Horn ............... F02C 7/264 431/1 |
| 2010/0071343 A1 | 3/2010 | Yu |
| 2016/0047318 A1 | 2/2016 | Dam et al. |

OTHER PUBLICATIONS

Ahmed, S. F. A. F. S., Spark Ignition of Turbulent Non-premixed Flames, Dissertation submitted for the degree of Doctor of Philosphy, University of Cambridge (2006) 267 pages.

Berg, A., Flexible Ignition System for a Gas Turbine, Student project for Siemens Industrial Turbomachinery AB, KTH Industrial Engineering and Management, Stockholm, approved Jun. 19, 2012, 99 pages.

Harris Air-Fuel Hand Torches brochure, 4 pages.

Beyerlein, S. et al., Homogeneous Charge Combustion of Aqueous Ethanol, Research and Special Programs Administrations, U.S. Department of Transportation, Feb. 2001, 25 pages.

\* cited by examiner

SWIRL TORCH IGNITER

CROSS-REFERENCE TO PROVISIONAL APPLICATION

This nonprovisional patent application claims the benefit under 35 U.S.C. § 119(e) and priority to U.S. Provisional Patent Application Ser. No. 62/344,354, filed on Jun. 1, 2016, entitled "Swirl Torch Igniter," which is hereby incorporated herein by reference in its entirety.

STATEMENT REGARDING FEDERALLY SPONSORED RESEARCH

This invention was made with government support by the National Aeronautics and Space Administration (Grant No. NNX09AV09A). The government has certain rights in the invention.

TECHNICAL FIELD

Embodiments are related to ignition systems. More specifically, embodiments relate to techniques utilizing spark igniters or torch igniters for ignition applications.

BACKGROUND

Igniters have been used in many applications to initiate or ignite a combustive reaction. For example, conventional gas ovens are equipped with electrical igniters to ignite the gas flowing through a burner in the heating compartment. Other examples include igniters used to ignite or 'light up' gas turbine engines. Yet other examples include igniters used to ignite combustion in rocket engines.

Interest in commercial space exploration is driving a push for developments that reduce costs and provide improved technology for space commercialization. Various types of fuels have been used for rocket propulsion in the aerospace industry. Previous research and development efforts have been directed towards traditional fuels such as hydrogen and kerosene. Recently, the use of methane as a rocket propellant has reemerged in the aerospace industry.

The lack of focused research in the use of methane and other fuels for rocket engine propellant has left a void in the development of improved ignition sources for propulsion systems. Thus, a need remains for improved techniques to ignite propellant mixtures comprising fuels such as methane.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved ignition apparatus.

It is another aspect of the disclosed embodiments to provide for an improved spark igniter or torch igniter for ignition applications.

The aforementioned aspects and other objectives and advantages can now be achieved as described herein. A torch igniter and a method of igniting a torch flame are disclosed herein. An example embodiment includes a body including an oxidizer inlet configured to facilitate oxidizer flow through the body toward an output end of the body. The body includes a group of fuel inlet passages configured to distribute fuel in a direction tangential to the oxidizer flow through the body to create a swirling fuel-oxidizer mixture. A sparking element can be mounted on the body to produce a spark in the path of the swirling fuel-oxidizer mixture to ignite the mixture. The output end of the body is configured to emit a torch flame when the fuel-oxidizer mixture is ignited. Thus, a swirl torch igniter is configured for oxidizer and fuel flow through the igniter body to create an internal swirling fuel-oxidizer mixture to be ignited by a sparking element.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1A:
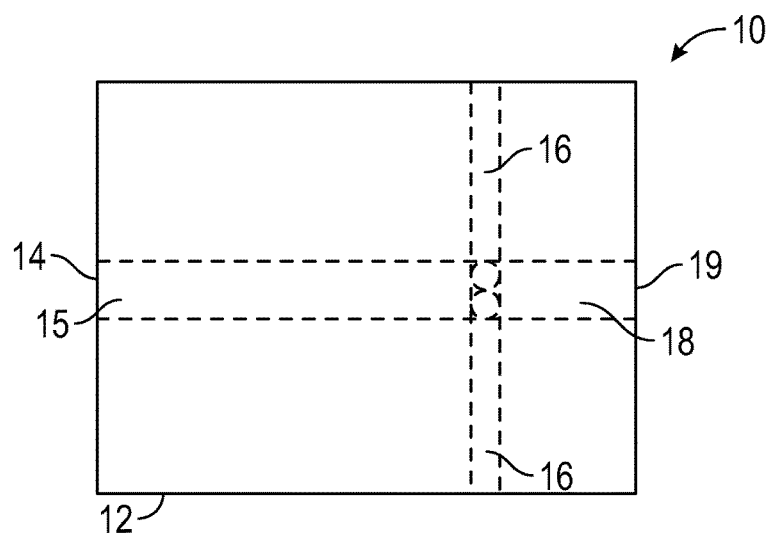
FIG. 1A illustrates a schematic drawing illustrating a longitudinal cross-sectional of an igniter body according to some example embodiments.

The particular values and configurations discussed in these non-limiting examples can be varied and are cited merely to illustrate at least one embodiment and are not intended to limit the scope thereof.

The example embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like or similar elements throughout, although such numbers may be referenced in the context of different embodiments. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. Relatedly, certain features may be omitted in certain figures, and this may not be explicitly noted in all cases.

While various embodiments are described herein, it should be appreciated that the present invention encompasses many inventive concepts that may be embodied in a wide variety of contexts. Thus, the following detailed description of exemplary embodiments, read in conjunction with the accompanying drawings, is merely illustrative and is not to be taken as limiting the scope of the disclosed embodiments. Rather, the scope of the invention is defined by the appended claims and equivalents thereof.

Illustrative embodiments of the invention are described below. In the interest of clarity, not all features of an actual implementation are necessarily described for each embodiment disclosed in this specification. In the development of any such actual embodiment, numerous implementation-specific decisions must be made to achieve the design-specific goals, which will vary from one implementation to another. It will be appreciated that such a development effort, while possibly complex and time-consuming, would nevertheless be a routine undertaking for persons of ordinary skill in the art having the benefit of this disclosure.

Liquid methane (LCH4) is a good propellant for rocket engine propulsion. Methane has a relatively high specific impulse, a competitive energy density, and is safer to handle and store compared to some other propellants. Other advantages include the ability to store both methane and oxidizer at similar temperatures. It is also non-toxic and less expensive compared to liquid hydrogen and hypergolic propellants. It has also been suggested that methane could be synthesized from carbon rich atmospheres or other sources in outer space, expanding in situ resource utilization. The National Aeronautics and Space Administration (NASA) has identified the propellant combination of liquid oxygen (LOX) and liquid methane as a propellant combination for next generation propulsion systems.

In order to design a reliable ignition source for implementation in rocket engine propulsion, it is important to understand how the ignition system operates under different test environments. To fulfill this objective, the inventors of this disclosure devoted a significant amount of time, expense, and effort to construct and implement a testing facility to evaluate and analyze igniter embodiments of the invention. This research included development of a cryogenic delivery system, development of an optically accessible combustion chamber to view igniter testing, and implementation of a data acquisition and remote control system. This extensive effort led to the design and production of reliable igniters, particularly for use with, but not limited to, oxygen-methane mixtures.

Analysis and characterization of igniter embodiments of the invention involved the determination of ignitability limits at different propellant inlet conditions. Propellant temperature and mixture ratio were among the variable factors associated with ignition that were incorporated in test matrices. In this regard, in some embodiments described herein, the temperature and pressure of fuel and oxidizer may be monitored and regulated in order to control the temperature, pressure, and flow rates of the fuel and oxidizer. Testing included consideration of different oxidizer-fuel phase interactions (i.e., gas-gas, liquid-gas, liquid-liquid). Igniter analysis included: liquid oxygen in combination with cold gaseous methane and liquid methane; ambient temperature gaseous oxygen in combination with gaseous methane at ambient and lower temperatures; liquid oxygen interacting with ambient temperature gaseous methane; and ambient temperature gaseous oxygen with liquid methane.

Other considerations made during design of the igniter embodiments included geometry aspects such as tangential and oxidizer post length, diameter, and location of the ignition source; this is further described with respect to the disclosed embodiments, wherein tangential post is referred to as "tangential fuel passage" (e.g., 16) and oxidizer post is referred to as "oxidizer inlet channel" (e.g., 15). For some igniter applications, it is convenient to use the main fuel source as the fuel source for the igniter (e.g., in a space context), e.g., to use the boil-off, that is, the gas formed in fuel (e.g., LCH4) and oxidizer (e.g., LOX) storage tanks above the liquid by evaporation. Such implementations were factored into the igniter analysis.

FIG. 1A illustrates a longitudinal cross-section of an igniter 10 or of a portion thereof, according to some example embodiments. This view shows in phantom (dotted lines) the internal ports or passages formed in the igniter body 12. The upstream end of igniter 10/body 12 includes an oxidizer inlet port 14. Oxidizer inlet port 14 leads (downstream) into an oxidizer inlet channel 15, which extends (in the direction from left to right in the FIG. 1) along a portion of the longitudinal axis of the igniter body 12. Four tangential fuel passages 16 are formed to intersect with the oxidizer inlet channel 15 (two fuel passages 16 are shown in FIG. 1A; all four are shown in FIG. 1B, discussed below).

Other example embodiments may be formed with two, three, or more than four fuel passages 16. However, at least two fuel passages are preferred in order to generate a swirling mixture, as further described below. The oxidizer inlet channel 15 leads to a central mixer section 18, just past the intersection with the fuel passages 16. The mixer section 18 leads to a combustion chamber 19, which is located at the end of igniter 10/body 12 that is longitudinally opposite to inlet port 14. A sparking element (not shown in FIG. 1A) is used to ignite the swirling mixture in the combustion chamber 19 (described below with reference to FIG. 4).

Figure 1B:
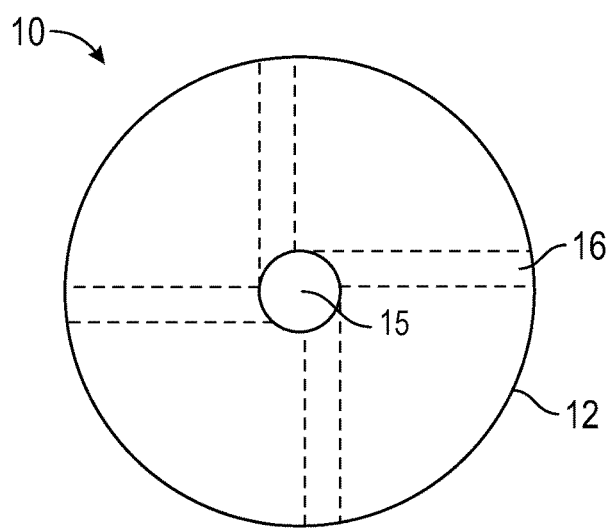
FIG. 1B illustrates a circumferential cross-sectional view of the igniter body of FIG. 1A in accordance with an example embodiment.

FIG. 1B depicts a circumferential cross-sectional view of the igniter 10 of FIG. 1A, with the fuel passages 16 shown in phantom (dotted lines), in accordance with an example embodiment. As seen in the illustration of FIG. 1B, the fuel passages 16 can be formed radially through the body 12 to tangentially intersect with the oxidizer inlet channel 15. Each fuel passage 16 can be formed such that the intersection with the oxidizer inlet channel 15 is slightly offset from the central longitudinal axis of the inlet channel 15, as depicted in FIG. 1B.

This configuration produces an internal mixture swirl powered by the momentum of the colliding injections of fuel (from fuel passages 16) and oxidizer (from oxidizer inlet channel 15). In operation, the oxidizer flows through the inlet channel 15 (from left to right in FIG. 1A) and meets the four tangential fuel passages 16 in order to form a swirl that causes the mixing of the propellants (i.e., fuel and oxidizer) prior to ignition.

As indicated in the illustration of FIG. 1B, the fuel passages 16 are formed/disposed in igniter body 12 so as to be circumferentially spaced apart along the outer circumference of igniter body 12, at intervals that are evenly spaced apart in the circumferential direction (specifically, at 0 degrees, 90 degrees, 180 degrees and 270 degrees), thus dividing the outer circumference into four circumferentially extending quadrants.

In other example embodiments, the circumferential locations of the fuel passages 16, and/or the spacing between those circumferential locations, may be different from that shown in FIG. 1B. The spacing may but need not be equal between every two adjacent fuel passages 16. As previously mentioned, the sparking element used to ignite the fuel-oxidizer mixture is not shown in FIG. 1A or FIG. 1B for clarity of illustration of the internal passages configured to produce the swirling mixture; the sparking element is described below with respect to FIG. 4.

Figure 2:
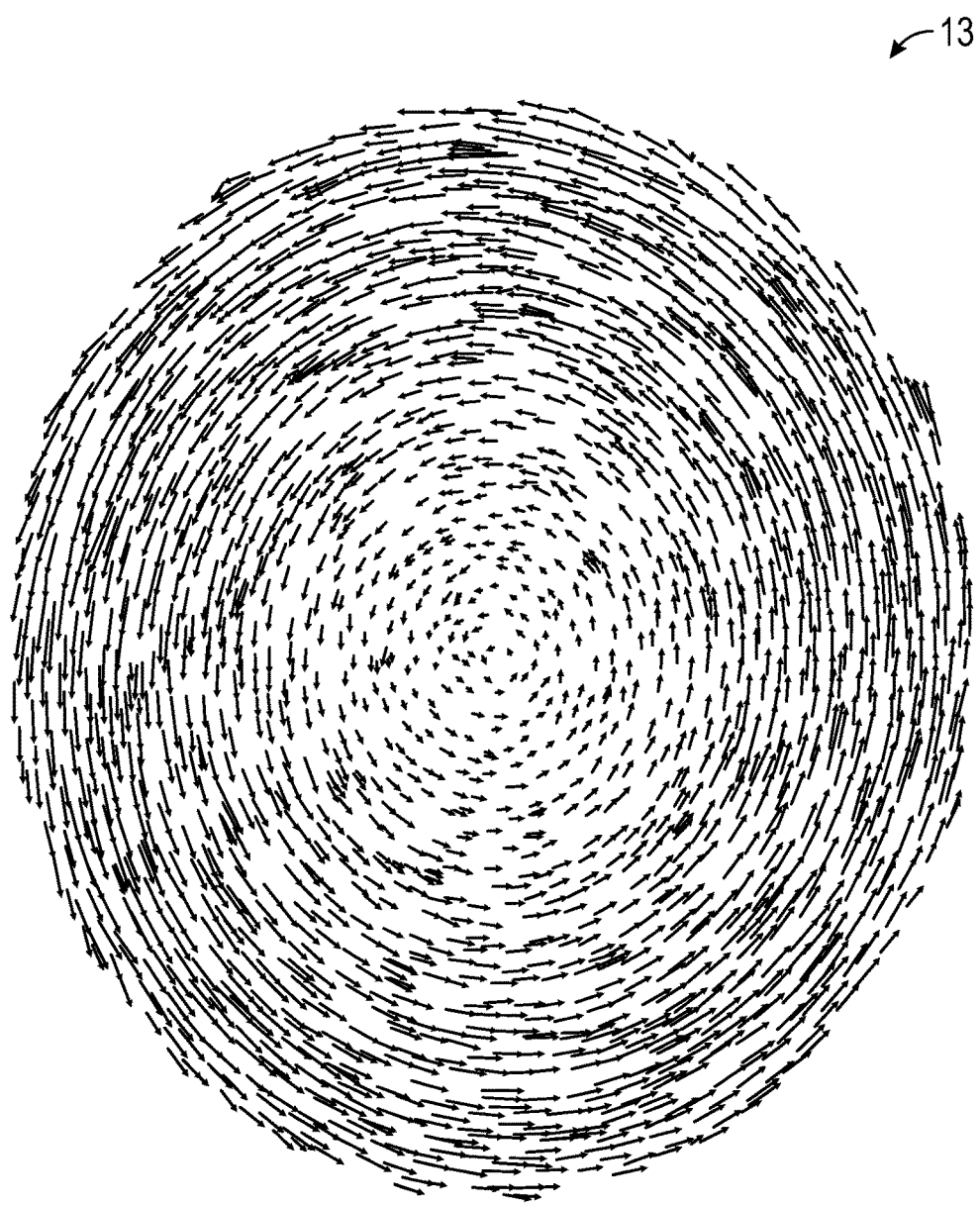
FIG. 2 illustrates a modeled velocity vector diagram of an oxidizer-fuel intersection in an igniter according to some example embodiments.

FIG. 2 illustrates a diagram 13 of modeled velocity vectors of the fuel-oxidizer mixture at the location along the longitudinal extent of body 12 at which methane, for example, is injected through the fuel passages 16 to mix with the oxidizer flowing through the oxidizer inlet channel 15. This is at the intersection where fuel enters from the passages 16 to mix with oxidizer in the inlet channel 15, which occurs longitudinally as the mixture enters the central mixer section 18. The modeled velocity vectors illustrate the swirling of the fuel-oxidizer mixture.

The igniter 10 body may be formed of any suitable material (e.g., metal) as known in the art, taking into consideration that input oxidizer and/or fuel temperatures and phases may vary. Although the igniter 10 embodiment depicted in FIG. 1A and FIG. 1B is formed with a cylindrical body 12 having a longitudinal axis, other embodiments of the invention may be formed with different body geometries (e.g., square or other polyhedron configuration). The oxidizer and fuel passage configuration and dimensions in such embodiments can also be varied, provided the disclosed tangential intersection configuration to produce mixture swirl is maintained.

Figure 3A:
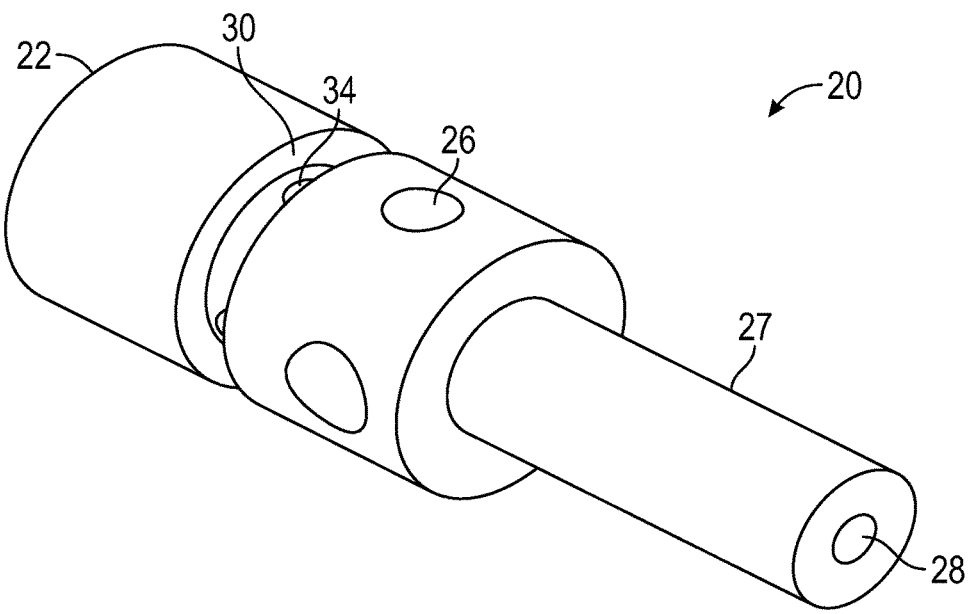
FIG. 3A illustrates a schematic drawing illustrating a three-dimensional perspective view of an igniter according to some example embodiments.
Figure 3B:
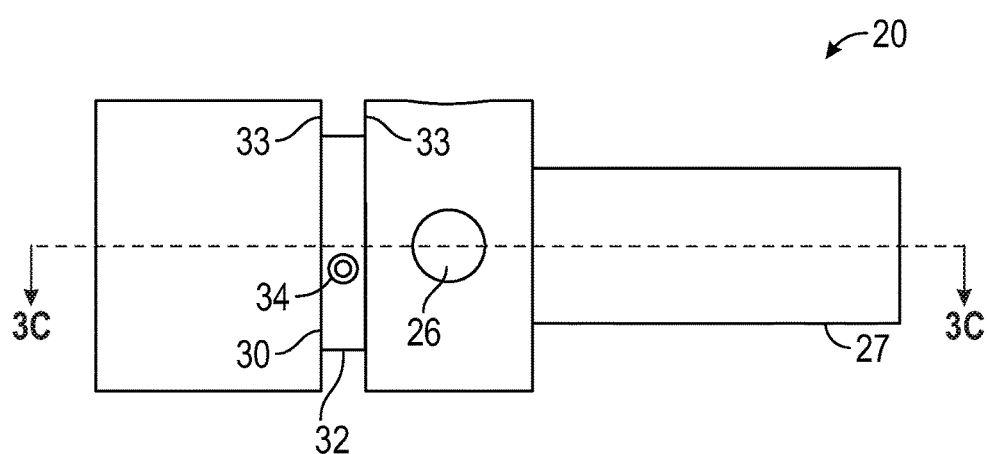
FIG. 3B illustrates a top view of the igniter of FIG. 3A, in accordance with an example embodiment.
Figure 3C:
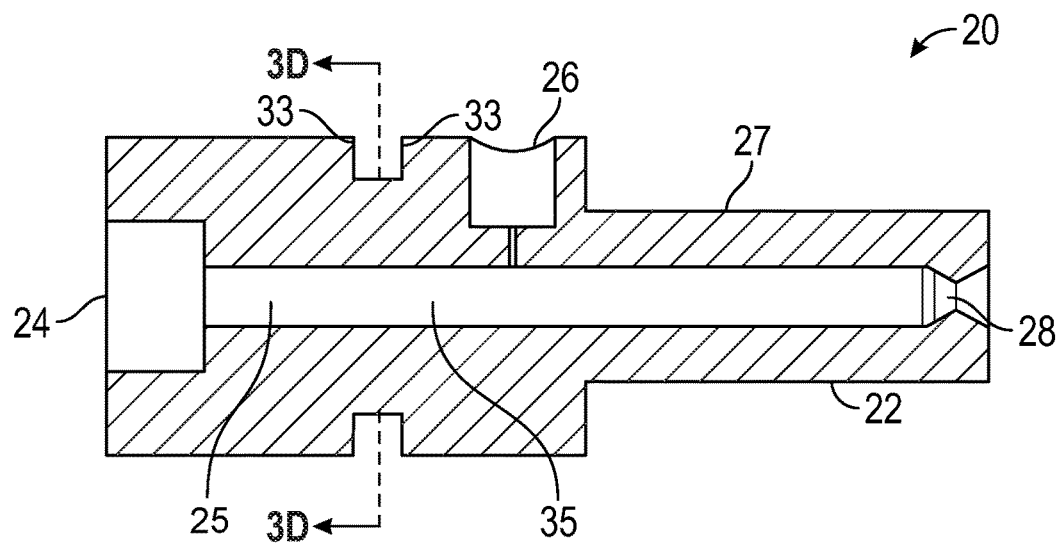
FIG. 3C illustrates a longitudinal cross-sectional view of the igniter of FIG. 3A, taken along section H-H of FIG. 3B, in accordance with an example embodiment.
Figure 3D:
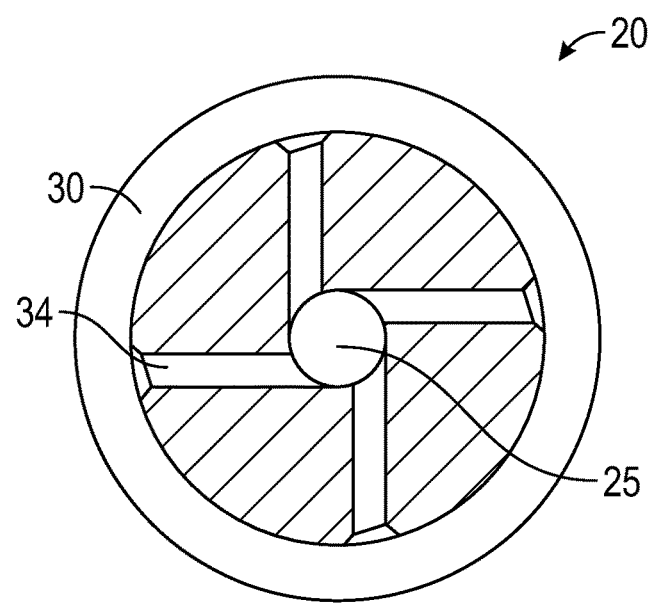
FIG. 3D illustrates a circumferential cross-sectional view of the igniter of FIG. 3A taken along section I-I shown in FIG. 3C, in accordance with an example embodiment.
Figure 3E:
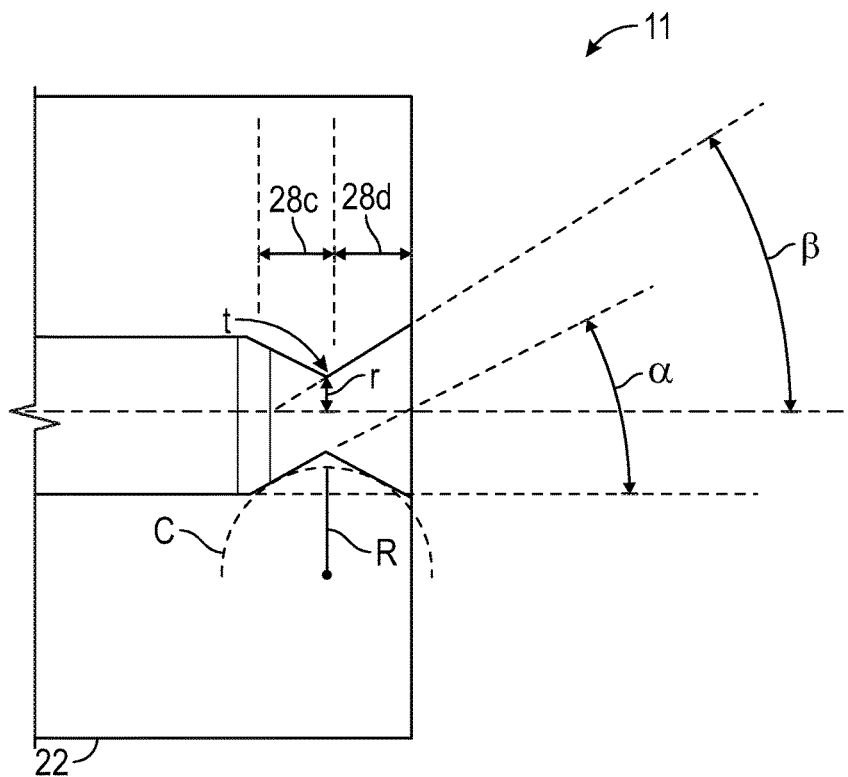
FIG. 3E illustrates a close-up view of the nozzle region of FIG. 3C, in accordance with an example embodiment.

FIGS. 3A-E illustrate another igniter 20, according to some embodiments. FIG. 3A shows a three-dimensional perspective view of the igniter 20; FIG. 3B shows a top view of the igniter 20; FIG. 3C is a longitudinal cross-sectional view of the igniter of FIG. 3A, taken along section H-H of FIG. 3B; FIG. 3D is a circumferential cross-sectional view of the igniter of FIG. 3A taken along section I-I shown in FIG. 3C; and FIG. 3E illustrates a diagram 11 that provides a close-up view of the nozzle region of FIG. 3C. As seen in FIGS. 3A-3E, the igniter 20 includes an elongated body 22 with (in order from upstream to downstream (left to right in FIGS. 3A, 3B, and 3C)) an oxidizer inlet port 24 at the upstream end, a longitudinal oxidizer inlet channel 25 extending longitudinally through body 22, a sparking element port 26, a mixing chamber 35, and an extended combustion chamber 27 leading to a torch flame outlet 28 at the downstream end of body 22. FIGS. 3C and 3E show a contoured converging-diverging-nozzle exit at the torch flame outlet 28.

Turning to FIG. 3E, according to some example embodiments, the angle of convergence $\alpha$ of the converging section 28c of the nozzle may vary between 2° to 15° inclusive, while the angle of divergence $\beta$ of the diverging portion 28d of the nozzle may vary between 15° to 40° inclusive. One or both of the converging section 28c and the diverging section 28d may but need not be bell or conical in shape. According to some example embodiments, the radius of curvature (R) between the converging and diverging sections 28c, 28d is equal or substantially equal to 1.5 times the radius r of the nozzle throat t. In this regard, the throat t is the narrowest point of the nozzle, i.e., where the converging section 28c meets the diverging section 28d. The radius of curvature, R, is the reciprocal of the curvature of a curve, and in this case equals the radius R of the circular arc c (shown by the dotted line) that best approximates the curve defined by the outer contour (in the longitudinal, not circumferential, direction) of the body in the region of the throat t, where the converging section 28c and the diverging section 28d meet.

The length of the converging-diverging nozzle section remains dependent on the geometric angle, radius, and velocity constraints applied to this section. Turning to FIGS. 3A-3D, an annular groove or channel 30 is formed around the entire circumference of the body 22 in between the oxidizer inlet port 24 and the sparking element port 26. The annular channel 30 is formed to extend radially inward, to a uniform depth all around the circumference of body 22. Channel 30 may be understood as defined by an annular base or bottom 32 and two annular side walls 33. At the base 32 of channel 30, fuel passages 34 are formed extending radially through the body 22 and intersecting into oxidizer inlet channel 25, as shown, e.g., in FIG. 3D.

Figure 4:
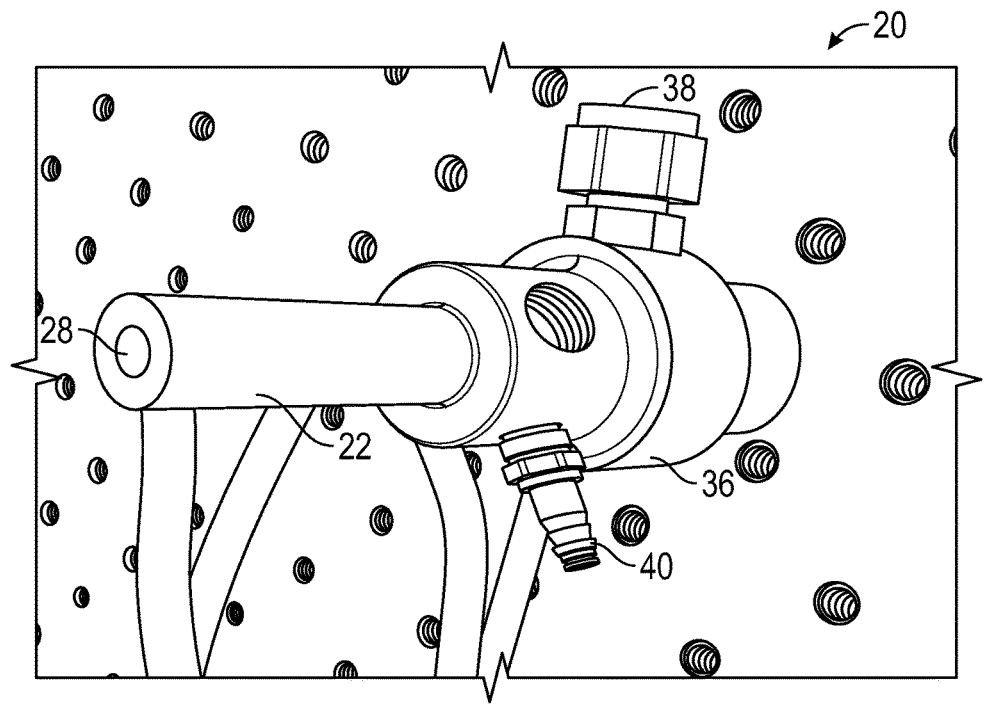
FIG. 4 illustrates a photo image of an igniter according to some example embodiments.

As in the manner described for igniter 10, here too in igniter 20 the fuel passages 34 intersect with the oxidizer inlet channel 25 tangentially, as seen in FIG. 3D, in such a fashion as to produce a swirling mixture of the propellants (e.g., methane and oxidizer). Sparking element port 26 may include a spark plug for igniting the swirling fuel-oxidizer mixture, as described below with reference to FIG. 4. As seen in FIG. 3C, mixing section 35 extends longitudinally between the fuel passages 34 and the sparking element port 26. FIGS. 3A, 3C, and 4 show a circular opening longitudinally aligned with sparking element port 26 but circumferentially removed from sparking element port 26 (labeled as "¼-32 THRU" in FIG. 3C). This opening may be used, e.g., for conducting pressure measurements. This opening is not necessary for igniter 20 (or 10) and may be omitted from embodiments described herein.

Although, as seen in FIG. 3D, igniter 20 is also configured with four fuel passages 34, other embodiments may be formed with two, three, or more than four fuel passages 34. The igniter 20 dimensions depicted in FIGS. 3B-3D are exemplary of one embodiment. The dimensions shown in FIGS. 3B-3D are in inches. Other embodiments may be implemented with varying dimensions and tolerances.

Turning to FIG. 4, the igniter 20 of FIGS. 3A-3E are shown ready for connection to oxidizer and fuel feed lines. An annular yoke or ring 36 is disposed on the igniter body 22 over annular channel 30 so as to encircle the channel 30 and to seal the channel 30 from the ambient environment, to create a sealed or enclosed channel. The ring 36 is fitted with a primary fuel inlet 38. In this embodiment, the ring 36 has been welded onto the body 22 to fully seal the ring over the channel 30. Those skilled in the art will appreciate that other embodiments may be implemented with the ring 36 formed on the body 22 such that the igniter 20 is a single unit (e.g., using modern machining, casting techniques, 3D printing, etc.). The porting on the igniters 20, 10 may be formed via conventional drilling or other known means (e.g., water-jet cutting techniques).

The primary fuel inlet 38 is configured with a conventional connector to receive a fuel feed line. With this configuration, fuel can be injected into the igniter 20 via a feed line connected to the primary inlet 38. The fuel flow then proceeds circumferentially around/through the annular channel 30 within/under ring 36, enters the fuel passages 34, and flows through the fuel passages 34 to collide with the oxidizer flow in the oxidizer inlet channel 25. Upon production of the swirling oxidizer-fuel mixture in the mixing section 35 (shown in FIG. 3), a sparking element 40 is used to ignite (initiate combustion of) the mixture.

Figure 5:
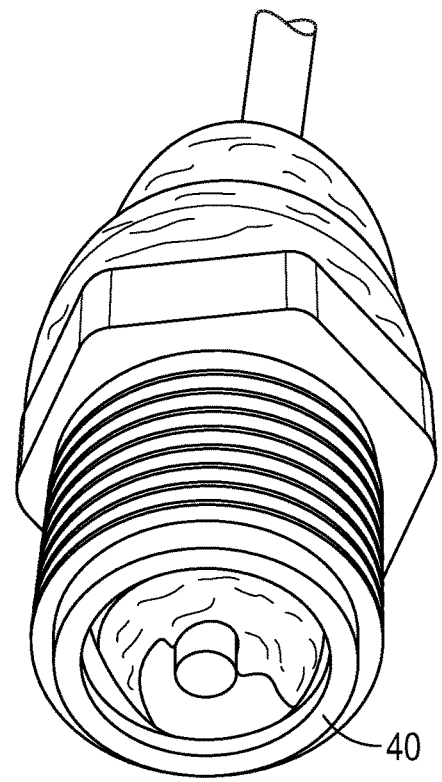
FIG. 5 illustrates a photo image of a sparking element that can be utilized in accordance with some example embodiments.

In some embodiments, the sparking element 40 is a spark plug mounted in the sparking element port 26. One embodiment may comprise an NGK® spark plug (¼-32 fitting, 5V ignition signal voltage, 8V ignition power voltage, 16 kV ignition energy voltage, 300 Hz), as shown in FIG. 5. The sparking element 40 provides an electrical discharge to ionize a fraction of the propellant (e.g., methane-oxidizer) stream, causing it to combust the fuel-oxidizer mixture and propagate a flame in the downstream direction from the sparking element 40 (i.e., rightward in FIGS. 3A-3C; leftward in FIG. 4) through the igniter 20 body to emit an anchored torch flame at the downstream end, namely, torch flame outlet 28. It will be appreciated that the sparking element 40 may be coupled to a suitable electrical source for activation as needed according to the particular igniter 20 application.

Figure 6:
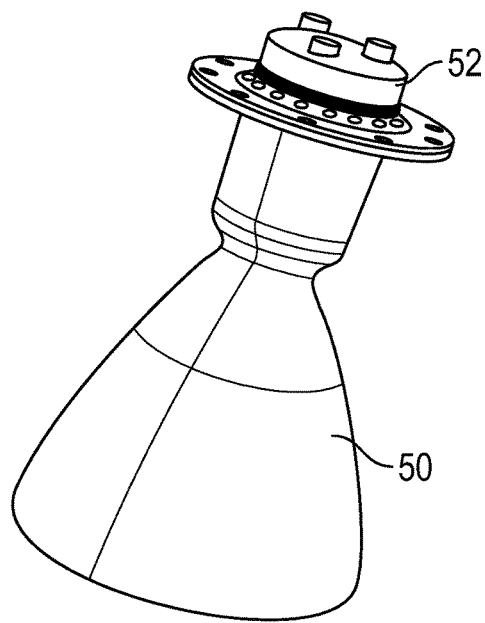
FIG. 6 illustrates a schematic drawing of a conventional rocket engine.
Figure 7:
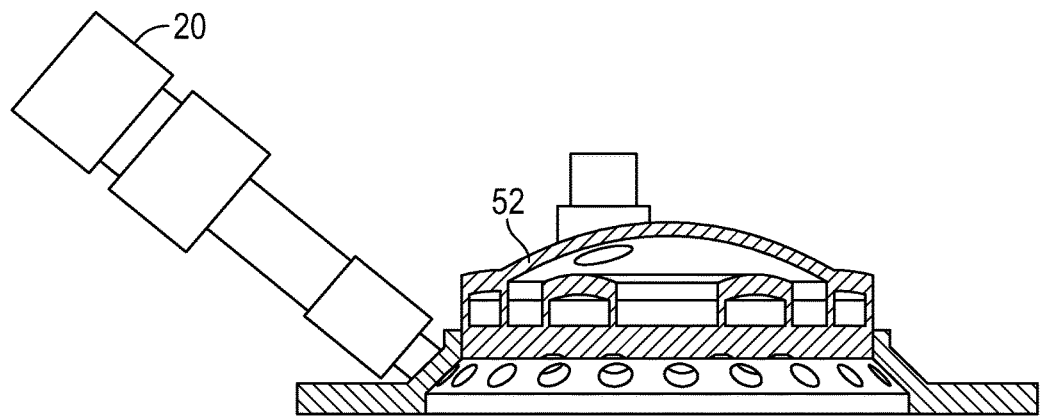
FIG. 7 illustrates a schematic drawing of the rocket engine of FIG. 6 implemented with an igniter according to some example embodiments.
Figure 8:
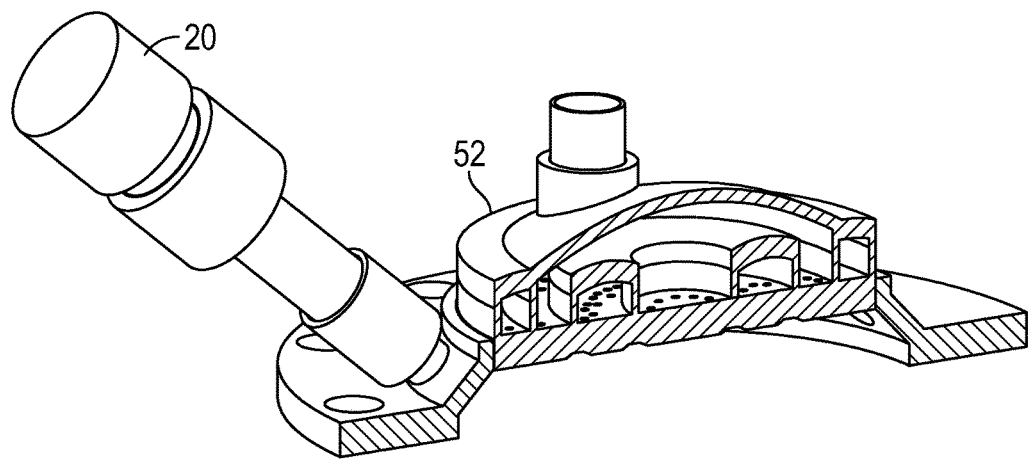
FIG. 8 illustrates another schematic drawing of the rocket engine of FIG. 6 implemented with an igniter according to some example embodiments.

Igniters according to disclosed embodiments may be used for various applications utilizing different propellant mixtures. As previously mentioned, the inventors carried out extensive testing of igniters for use in rocket propulsion systems utilizing oxygen for the oxidizer and methane for fuel. Turning to FIG. 6, a conventional rocket engine 50 is shown. The engine 50 comprises a fuel inlet housing 52 at the upper end. FIG. 7 shows a cut-away view of the fuel inlet housing 52 configured with an igniter 20. The igniter 20 is mounted on the housing 52 such that, when the igniter 20 is activated, the torch flame emitted from the downstream end ignites the propellant (e.g., methane and oxygen) in the engine 50 to light up the engine 50. FIG. 8 shows another cut-away view of the fuel inlet housing 52 with the igniter 20 mounted thereto. For clarity of illustration, in FIGS. 7-8, the igniter 20 is shown without the oxidizer and fuel feed lines and without the sparking element 40 connected to the igniter body. It will be appreciated by those skilled in the art that these lines and connections can be implemented in various suitable ways tailored for the desired application.

Figure 9:
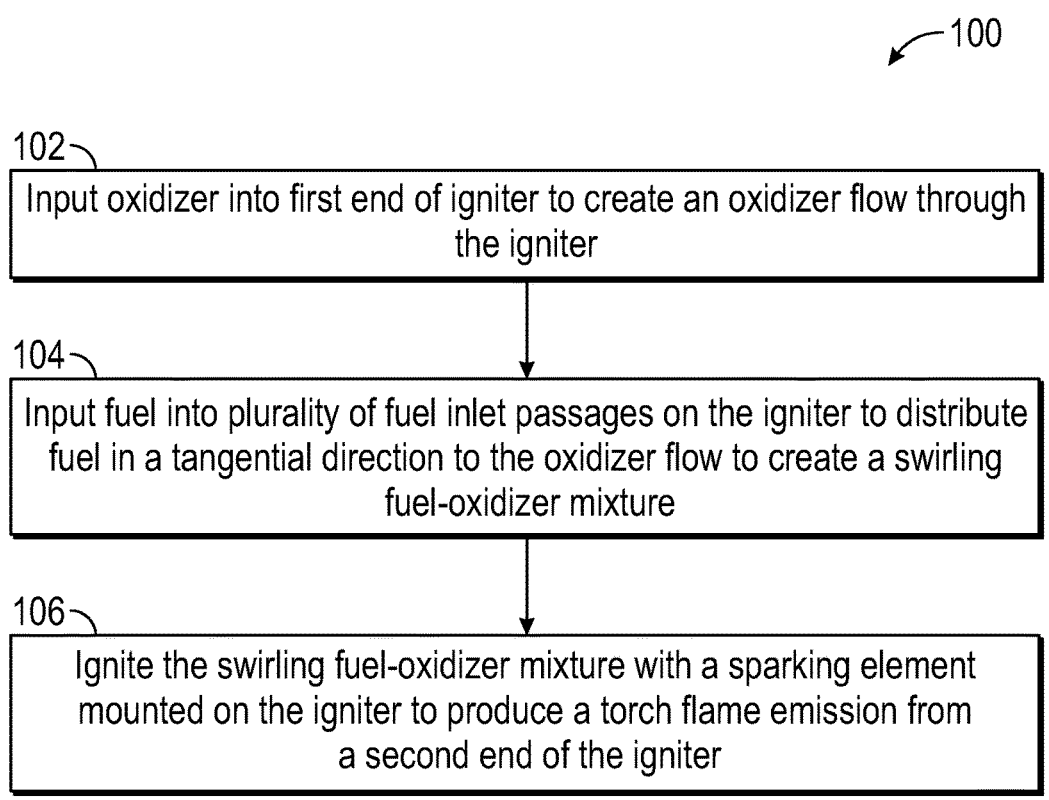
FIG. 9 illustrates a flow chart of operations depicting, at a top level, a method for igniting a torch flame according to some example embodiments.

FIG. 9 illustrates a flow chart of operations illustrating logical operations or steps of a method 100 for igniting a torch flame, in accordance with an example embodiment. As indicated at block 102, a first step, an oxidizer is inputted into a first (e.g., upstream) end of an igniter to create an oxidizer flow through the igniter. As indicated thereafter at block 104, a second step, fuel is input into a plurality of fuel inlet passages on the igniter configured to distribute the fuel in a direction tangential to the oxidizer flow to create a swirling fuel-oxidizer mixture. As shown next at block 106, a third step, the swirling fuel-oxidizer mixture can be ignited with a sparking element mounted on the igniter to produce a torch flame emission from a second (e.g., downstream) end of the igniter.

Based on the foregoing, it can be appreciated that a number of example embodiments are disclosed herein. For example, in one embodiment, a torch igniter can be implemented that includes a body including an oxidizer inlet configured to facilitate oxidizer flow through the body toward an output end of the body; the body including a plurality of fuel inlet passages configured to distribute fuel in a direction tangential to the oxidizer flow through the body to create a swirling fuel-oxidizer mixture; a sparking element mounted on the body to produce a spark in the path of the swirling fuel-oxidizer mixture to ignite the mixture; and wherein the output end of the body is configured to emit a torch flame when the fuel-oxidizer mixture is ignited.

In some example embodiments, the body can include a primary fuel inlet configured to distribute fuel to each of the plurality of fuel inlet passages. In other example embodiments, the oxidizer inlet can be configured to receive oxidizer comprising oxygen. In other example embodiment, the primary fuel inlet can be configured to receive fuel comprising methane. In still another example embodiment, the oxidizer inlet can be configured to receive oxidizer in a liquid or gas phase. In still other example embodiments, the primary fuel inlet can be configured to receive fuel in a liquid or gas phase.

In another example embodiment, a torch igniter can be implemented, which includes, for example: a body including a first end and a second end; the body including an oxidizer inlet disposed at the first end thereof; the oxidizer inlet configured to facilitate oxidizer flow through the body; the body including a primary fuel inlet configured to distribute fuel to a plurality of fuel inlet passages configured to distribute fuel in a direction tangential to the oxidizer flow through the body to create a swirling fuel-oxidizer mixture; a sparking element mounted on the body to produce a spark in the path of the swirling fuel-oxidizer mixture to ignite the mixture; and wherein the body is configured to emit a torch flame from the second end thereof when the fuel-oxidizer mixture is ignited.

In another example embodiment, a method for igniting a torch flame can be implemented. Such a method can include steps or operations such as, for example: inputting an oxidizer into a first end of an igniter to create an oxidizer flow through the igniter; inputting fuel into a plurality of fuel inlet passages on the igniter configured to distribute the fuel in a tangential direction to the oxidizer flow to create a swirling fuel-oxidizer mixture; and igniting the swirling fuel-oxidizer mixture with a sparking element mounted on the igniter to produce a torch flame emission from a second end of the igniter.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another unless indicated otherwise or so dictated by the description herein.

Similarly, although example methods or processes have been described with regard to particular steps or operations performed in a particular sequence, numerous modifications could be applied to those methods or processes to derive numerous alternative embodiments of the present invention. For example, alternative embodiments may include methods or processes that use fewer than all of the disclosed steps or operations, methods or processes that use additional steps or operations, and methods or processes in which the individual steps or operations disclosed herein are combined, subdivided, rearranged, or otherwise altered. Similarly, this disclosure describes one or more embodiments wherein various operations are performed by certain systems, applications, module, components, etc. In alternative embodiments, however, those operations could be performed by different components. It will also be appreciated by those skilled in the art that embodiments of the invention may be configured for automated or computer controlled igniter activation. Conventional computers and applications configured with appropriate software may be used to implement such embodiments.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A torch igniter, comprising:
   a body extending axially from an input end to an output end, the body including an oxidizer inlet channel configured to facilitate oxidizer flow through the body from the input end of the body to the output end of the body;
   the body including an annular channel formed around a circumference of the body for receiving fuel, the annular channel having a plurality of fuel inlet passages extending inward from the annular channel through the body, each fuel inlet passage of the plurality of fuel inlet passages tangentially intersecting the oxidizer inlet channel, the plurality of fuel inlet passages configured to distribute fuel from the annular channel to the oxidizer inlet channel to create a swirling fuel-oxidizer mixture within the oxidizer inlet channel;
   a sparking element mounted on and extending radially inward through the body to produce a spark in a path of the swirling fuel-oxidizer mixture to ignite the swirling fuel-oxidizer mixture; and
   wherein the output end of the body is configured to emit a torch flame when the swirling fuel-oxidizer mixture is ignited.

2. The torch igniter of claim 1, wherein the sparking element is mounted on the body between the plurality of fuel inlet passages and the output end of the body.

3. The torch igniter of claim 2, wherein the oxidizer inlet channel is configured to receive the oxidizer comprising oxygen.

4. The torch igniter of claim 3, wherein the annular channel is configured to receive the fuel comprising methane.

5. The torch igniter of claim 2, wherein the oxidizer inlet channel is configured to receive the oxidizer in a liquid or gas phase.

6. The torch igniter of claim 2, wherein the annular channel is configured to receive the fuel in a liquid or gas phase.

7. A torch igniter, comprising:
   a body extending axially from a first end to a second end;
   the body including an oxidizer inlet disposed at the first end thereof;
   the oxidizer inlet configured to facilitate oxidizer flow through the body from the first end to the second end;
   the body including an annular channel formed around an entire circumference of the body for receiving fuel, the annular channel having a plurality of fuel inlet passages extending inward from the annular channel through the body, each fuel inlet passage of the plurality of fuel inlet passages tangentially intersecting the oxidizer flow through the body, the plurality of fuel inlet passages configured to distribute fuel from the annular channel to create an internal swirling fuel-oxidizer mixture within the body between the first end and the second end;
   a sparking element mounted on and extending radially inward through the body to produce a spark in a path of the internal swirling fuel-oxidizer mixture to ignite the internal swirling fuel-oxidizer mixture; and
   wherein the body is configured to emit a torch flame from the second end thereof when the internal swirling fuel-oxidizer mixture is ignited.

8. The torch igniter of claim 7, wherein the oxidizer inlet is configured to receive the oxidizer comprising oxygen.

9. The torch igniter of claim 8, wherein the annular channel is configured to receive the fuel comprising methane.

10. The torch igniter of claim 7, wherein the oxidizer inlet is configured to receive the oxidizer in a liquid or gas phase.

11. The torch igniter of claim 7, wherein the annular channel is configured to receive the fuel in a liquid or gas phase.

12. A method for igniting a torch flame, comprising:
   inputting an oxidizer into a first end of an igniter to create an oxidizer flow through the igniter to a second end of the igniter, where the igniter extends axially from the first end to the second end;
   inputting fuel into an annular channel formed around an entire circumference of the igniter, the annular channel having a plurality of fuel inlet passages extending inward from the annular channel through the igniter, each fuel inlet passage of the plurality of fuel inlet passages tangentially intersecting the oxidizer flow, the plurality of fuel inlet passages configured to distribute the fuel from the annular channel to the oxidizer flow to create an internal swirling fuel-oxidizer mixture within the igniter between the first end of the igniter and the second end of the igniter; and igniting the internal swirling fuel-oxidizer mixture with a sparking element mounted on and extending radially inward through the igniter to produce a torch flame emission from the second end of the igniter.

13. The method of claim 12 wherein the igniter comprises a primary fuel inlet configured to distribute the fuel to the annular channel.

14. The method of claim 13 wherein the primary fuel inlet is configured to receive the fuel comprising methane.

15. The method of claim 13 wherein the primary fuel inlet is configured to receive the fuel in a liquid or gas phase.

16. The method of claim 13 wherein the first end of the igniter includes an oxidizer inlet configured to receive the oxidizer comprising oxygen.

17. The method of claim 16 wherein the oxidizer inlet is configured to receive the oxidizer in a liquid or gas phase.

18. The method of claim 12 wherein the first end of the igniter includes an oxidizer inlet configured to receive the oxidizer comprising oxygen.

19. The method of claim 18 wherein the oxidizer inlet is configured to receive the oxidizer in a liquid or gas phase.

20. The method of claim 12 wherein the sparking element is mounted on the igniter between the plurality of fuel inlet passages and the second end of the igniter.

\* \* \* \* \*